United States Patent Office 2,805,251
Patented Sept. 3, 1957

2,805,251

PREPARATION OF ARYLOXYALIPHATIC ACIDS AND SALTS THEREOF

Robert H. Marshall, Urbana, Ill., and Warren L. Perilstein and William E. Burt, Royal Oak, and Harold D. Orloff, Detroit, Mich., assignors to Ethyl Corporation, New York, N. Y., a corporation of Delaware No Drawing. Application July 22, 1953,
Serial No. 369,702

5 Claims. (Cl. 260—521)

This invention relates to the formation of aryloxyaliphatic acids and more particularly to a process for the condensation of salts of aromatic oxy compounds and haloaliphatic acid salts to form aryloxyaliphatic carboxylate salts which can subsequently be converted to aryloxyaliphatic acids by acidification.

Aryloxyaliphatic acids have become increasingly important in recent years as herbicides, plasticizers, chemical intermediates, and the like. Outstanding among these are 2,4-dichlorophenoxyacetic acid (2,4-D) and 2,4,5-trichlorophenoxyacetic acid (2,4,5,-T), which have achieved widespread success as herbicides and weed killers. Taking 2,4,5-T as an example, it is commonly made by acidification of 2,4,5-trichlorophenoxyacetate salts, such as sodium 2,4,5-trichlorophenoxyacetate or potassium 2,4,5-trichlorophenoxyacetate. The 2,4,5-trichlorophenoxyacetate salt is made normally by reaction of a 2,4,5-trichlorophenolate salt and a chloroacetate salt, for example, according to the equation

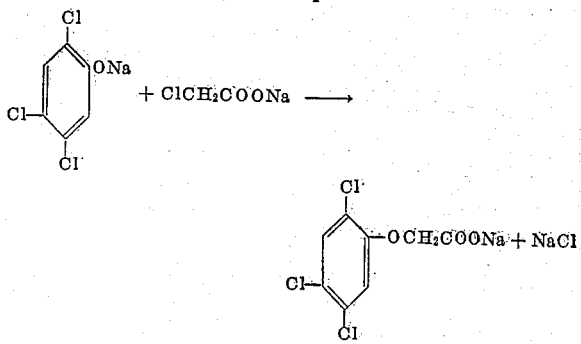

As is seen from this equation, the actual reactants in the condensation reaction are the salts of 2,4,5-trichlorophenol and chloroacetic acid. Since the free phenol and free chloroacetic acid are only feebly ionized in aqueous medium, it is necessary, for good results in the condensation reaction in aqueous medium, to use highly ionized derivatives of these compounds; namely, the salts such as alkali metal and alkaline earth metal salts. This condensation reaction is ordinarily carried out at elevated temperature, usually above 90° C., and in aqueous medium with the pH in the range of about 9 to 11. The desired pH can be obtained, for example, by mixing alkali metal trichlorophenolate and alkali metal chloroacetate in stoichiometric proportions. One way of adjusting pH within this range is to adjust the relative proportions of the two reactants; that is, to have the trichlorophenolate in greater or smaller proportion as compared with the chloroacetate. However, under such reaction conditions hydrolysis of chloroacetate to produce glycollates and other products competes with the condensation reaction. This results in loss of valuable chloroacetate, a subsequent loss in yield of 2,4,5-T, etc. A means of minimizing this hydrolysis and thereby increasing the yield of 2,4,5-T would be of great value to 2,4,5-T manufacturers.

In the manufacture of other aryloxyaliphatic acids by condensation of salts of aromatic oxy compounds with haloaliphatic acid salts under similar conditions, the same problem exists.

An object of the present invention is to provide a new and improved process for the manufacture of aryloxyaliphatic acid substances. Another object of the present invention is to provide a new and improved process for the manufacture of aryloxyaliphatic carboxy salts. An additional object is to provide a new and improved method for the manufacture of aryloxyaliphatic acids. An additional object is to provide a new and improved process for the manufacture of 2,4,5-T. A further object is to provide a process for the formation of aryloxyaliphatic acid salts in which hydrolysis of haloaliphatic acid salts is minimized.

By aryloxyaliphatic acid substances we mean either free aryloxyaliphatic acids or their salts.

A method of minimizing hydrolysis of haloaliphatic acid salts in the condensation of haloaliphatic acid salts with at least stoichiometric quantities of salts of aromatic oxy compounds in aqueous medium at temperatures above 90° C. and at pH 9 to 11 has now been discovered. Broadly, this method comprises mixing the reactants in such a manner that the entire amount of the available haloaliphatic carboxy ion (haloaliphatic acid salt or free haloaliphatic acid) is present in substantially hydroxide ion-free medium in the reaction mixture before a stoichiometrically equivalent amount of the aromatic oxy compound salt is present, and then continuing the addition of aromatic oxy compound salt until the latter is at least equivalent to the amount of available haloaliphatic ion employed.

Our method embodies the use of preformed aromatic oxy compound salt. That is, the salt of the aromatic oxy compound should be made up prior to use in the condensation reaction. This can be done either by treating the aromatic oxy compound with an appropriate alkaline reagent such as sodium hydroxide or ammonium hydroxide or preferably, particularly in the case of 2,4,5-T preparation, by hydrolyzing the corresponding haloaromatic compound with an alkaline reagent to produce directly the salt of the aromatic oxy compound, which can then be charged directly to the condensation reactor without the necessity of intermediate isolation of the free aromatic oxy compound. Specifically in the case of 2,4,5-T, this can be done by hydrolysis of 1,2,4,5-tetrachlorobenzene with sodium hydroxide solution and utilization of the resultant solution directly in the condensation reaction. On the other hand, in the case of the aliphatic acid salt, we have found that it is not necessary to preform the salt. The reactant that is charged to the condensation reaction may be either the aliphatic acid salt, free haloaliphatic acid, or a mixture of the two. In the latter two cases the haloaliphatic acid is converted, as mixing proceeds, to the corresponding salt by the action of the salt of the aromatic oxy compound and the alkaline material; if any, so that in effect it is converted to the salt form before an equivalent amount of salt of the aromatic oxy compound is present in the reactor. We speak of haloaliphatic reactant in the form of the salt or the free acid as "available haloaliphatic ion." This means, in other words, that the haloaliphatic acid salt or haloaliphatic acid is placed in the reaction vessel either before any of the aromatic oxy salt is placed therein or before an amount of the aromatic oxy salt equivalent to the total amount of haloaliphatic salt to be used in the reaction is added to the reactor.

We have found that when the reactants in the condensation process are mixed in the manner described above, significant yield increases of aryloxyaliphatic acids are realized. In fact, by use of our invention, quantitative conversion of haloaliphatic acid to aryloxyaliphatic acid are approached.

We have found that particularly good results are obtained when all the haloaliphatic salt (or its equivalent in free haloaliphatic acid which will be converted to haloaliphatic salt as the mixing proceeds) is placed in the reactor before more than about 5 percent of the aromatic oxy salt is present, and even better results are realized when all the haloaliphatic salt or the equivalent free acid is placed in the reactor before any of the aromatic oxy salt is present. In any aspect of the invention it has been found beneficial to introduce the chloroacetate reactant into the reaction mixture in a relatively short period of time. Generally, it is preferred that the time of feeding the chloroacetate reactant is not greater than two-thirds the total time of feeding all reactants.

A variety of ways of mixing the reactants in accordance with the terms of our invention will be recognized by those skilled in the art. One preferred method is to form a solution of haloaliphatic acid salt in water and to add to this the desired amount of aromatic oxy compound salt. Another preferred mode is to place haloaliphatic acid in the reactor and add to this a mixture of aromatic oxy compound salt solution and sufficient alkaline material (such as sodium hydroxide, potassium hydroxide, calcium oxide, ammonium hydroxide, etc.) to convert the haloaliphatic acid to haloaliphatic acid salt. In connection with this method it is to be noted that since haloaliphatic acids are stronger acids than are aromatic oxy compounds, the cation in the aromatic oxy compound salt will be transferred to the haloaliphatic acid to form the salt of the latter and free aromatic oxy compound as the mixing proceeds. Therefore, the haloaliphatic acid must necessarily be converted to its salt before an equivalent amount of aromatic oxy salt can be present. For this reason the advantages of our invention can be achieved even when starting with free haloaliphatic acid.

An especially preferred mode of carrying out the mixing is to place a portion (preferably not more than about 5 percent) of the aromatic oxy compound salt solution in the reaction vessel, then to add to this in a very short period of time the desired complete amount of haloaliphatic acid salt or an equivalent amount of haloaliphatic acid, then to add to this mixture the remaining aromatic oxy salt solution with alkaline material (needed when free haloaliphatic acid is employed). This method is especially preferred when carrying out the reaction in a continuous manner with excess aromatic oxy salt, as this provides for recycling of aromatic oxy salt solution continuously to the reactor while maintaining an easily stirrable and workable mixture in the reactor at all times.

Many other modes of accomplishing the addition will occur to those skilled in the art.

The following examples will serve to further illustrate the present invention.

*Example I*

The reactor employed was a sealed pot type vessel equipped with mechanical agitation, a reflux condenser, a heating device, and liquid and solid feed and discharge means. To this reactor was charged a solution containing 48 parts of sodium trichlorophenolate, 17.7 parts of sodium hydroxide, and 14.5 parts sodium chloride dissolved in 163 parts of water at a temperature of 45° C. To this solution was added 56.7 parts of solid chloroacetic acid and an additional 10 parts of water. The resulting solution was heated rapidly to reflux while adding an additional solution of 95 parts sodium trichlorophenolate and 6.3 parts sodium hydroxide dissolved in 160 parts of water. The mixture was then heated at reflux (106° C.) for two hours, after which the mixture was acidified to release the 2,4,5-T and cooled. The yield of 2,4,5-T obtained based on chloroacetic acid used was 77 percent.

In contrast to the preceding example, the following example demonstrates the inferior results obtained when former methods of admixing the reactants are employed.

*Example II*

The reactor employed was the same as that in Example I, and the amount of each reactant was identical to the amount used in Example I. The difference between the two examples is that in Example II the entire amount of the mixture of sodium trichlorophenolate, sodium hydroxide, sodium chloride, and water was placed in the reactor first and heated to reflux. When reflux temperature was reached, the entire amount of chloroacetic acid was added at once. Refluxing was then continued for two hours, after which the mixture was acidified to release the 2,4,5-T and cooled. The yield of 2,4,5-T based on chloroacetic acid was only 73 percent.

Thus, it can be seen that a yield increase of up to 6 percent is realized when practicing under this mode of our invention. In subsequent examples showing other modes of our invention even greater gains will be demonstrated.

Example III shows still another mode of carrying out our operation.

*Example III*

The make-up of the trichlorophenolate solution is that of Example I. Only 3 percent of the total amount of phenolate solution is initially placed in the reactor, and all the chloroacetic acid is added while holding the mixture at room temperature. The mixture is then heated rapidly to reflux while adding the remainder of the phenolate solution. After refluxing for two hours, followed by acidification, the yield of 2,4,5-T based on chloroacetic acid is even better than the yield obtained in Example I.

Our process is very susceptible of adaptation to continuous operation. One method of carrying out our reaction continuously is to run the condensation reaction as described above, then to acidify the reaction mixture while keeping it essentially at reaction temperature. Under these conditions the organic phase is molten and can be separated from the aqueous phase by conventional liquid-liquid separation means such as decantation and the like. The organic phase is treated after separation from the aqueous phase with a selective solvent to dissolve out unreacted excess phenol and leave substantially pure 2,4,5-T as the undissolved residue. The solution of phenol in organic solvent is then extracted, either batchwise or continuously, with an aqueous solution of excess alkaline material such as sodium hydroxide to reconvert the unused phenol to its sodium salt. The thereby formed sodium phenolate solution is then recycled back to the condensation reactor for use in a subsequent condensation step, and the solvent from which the phenol has been extracted is recycled to the extraction step in which the phenol is extracted from residual 2,4,5-T. In such a process it has been found advantageous for reasons of smoothness and ease of continuous operation to conduct the mixing of reactants in a manner which is exemplified by Example IV below.

*Example IV*

The reactor used was that of Example I. To this reactor was fed at constant feed rate over a period of 40 minutes a total of 377 parts of solution comprising 70 parts sodium trichlorophenolate, 17 parts sodium hydroxide, and 290 parts water. This solution had been produced by aqueous alkaline extraction of a solution of 2,4,5-trichlorophenol in cyclohexane which in turn had been obtained by extraction with cyclohexane of a 2,4,5-T/2,4,5-trichlorophenol mixture obtained by condensation of sodium chloroacetate and excess sodium 2,4,5-trichlorophenolate and subsequent acidification. After 5 minutes of the above 40-minute feed period, 10.5 parts of chloroacetic acid was added at a temperature of less than 45° C.

After 10 minutes an additional 10.5 parts of chloroacetic acid was added at a reactor temperature of 45° C. After 5 more minutes addition of this amount of chloroacetic acid was repeated at a reactor temperature of 55° C., and after another 2.5 minutes a fourth portion of 10.5 parts of chloroacetic acid was added at a reactor temperature of 65° C. At the end of 25 minutes of the feed of this recycle sodium trichlorophenolate solution, feeding was begun of another sodium trichlorophenolate solution. This latter solution was obtained by hydrolysis of 1,2,4,5-tetrachlorobenzene with sodium hydroxide in methanol solution, followed by addition of water and removal of the methanol by distillation. This second sodium trichlorophenolate solution comprised 162 parts of sodium trichlorophenolate, 13 parts of sodium hydroxide, 52 parts of sodium chloride, and 268 parts of water. This feed was regulated so as to introduce the entire amount of this second stream at constant feed rate in a 15-minute period. Concurrently with the beginning of this second feed stream, 10 parts of chloroacetic acid was added to the reactor at a reactor temperature of 83° C. After 5 minutes an equal portion of chloroacetic acid was added at a reactor temperature of 88° C. After another 5 minutes an equal portion of chloroacetic acid was added at a temperature of 98° C. Finally, after an additional 2.5-minute period, another 10 parts of chloroacetic acid was added. After the end of the feed of the second 2,4,5-trichlorophenolate stream, the mixture was refluxed at 105° C. for 2 hours. It was then acidified with excess mineral acid and the organic layer separated from the aqueous layer by decantation at a temperature of 100° C. The organic layer was then extracted with 2.3 parts of cyclohexane per part of organic material at a temperature of 35° C. This extraction was carried out on a continuous basis. The raffinate was separated from the undissolved 2,4,5-T by filtration and the raffinate cycled continuously to a second extractor wherein it was in turn extracted with 9.5 percent aqueous sodium hydroxide solution in the ratio of 0.46 parts sodium hydroxide solution per part of organic solution. The extracted cyclohexane was then returned continuously to the original extraction step, and the aqueous solution of sodium trichlorophenolate with excess sodium hydroxide was stored for subsequent use in the condensation reaction. After 48 hours of steady state operation in this fashion the average conversion of chloroacetic acid to 2,4,5-T was 90 percent.

It will be realized that wide variation is permitted in the above procedure with respect to the nature and amounts of the selective solvents used, the nature and amounts of the alkaline extractant, etc. For example, any solvent which has an appreciable solubility for trichlorophenol and a very limited solubility for 2,4,5-T is satisfactory. Hydrocarbons and their halogen derivatives are especially suitable for such purposes. In addition to the cyclohexane cited in the above example, other hydrocarbons, such as kerosene, benzene, toluene, xylene, octane, and the like, and their halogenated derivatives, such as perchloroethylene, ethylene dichloride, carbon tetrachloride, chlorobenzene, o-dichlorobenzene, and the like, are capable of use. Depending on the particular solvent to be used, the ratio of solvent to organic layer extracted will vary. Likewise, the nature of the alkaline material used to extract phenol from the organic extractant can vary within the usual range of equivalents; that is, potassium hydroxide, magnesium hydroxide, sodium oxide, and the like are satisfactory.

Still other processes which fall within the scope of our invention are illustrated by the following examples.

Example V

The procedure of Example I is repeated except that in this case all the chloroacetic acid is placed in the reactor prior to the addition of any of the trichlorophenolate solution. Yields of 2,4,5-T obtained in this fashion are even better than those in Examples I and III.

This procedure may also be carried out, as may any of the procedures of Examples I, III, and IV, by beginning initially with solutions of salts of chloroacetic acid such as sodium, potassium, lithium, calcium, ammonium, and the like, as well as with the free acid in molten or solid form or in aqueous solution.

Example VI

The procedure of Example I is carried out except that 90 percent of the trichlorophenolate solution is placed in the reactor first, and then all the chloroacetic acid is added. The remainder of the trichlorophenolate solution is then added and the mixture refluxed for 2 hours, etc. Although yields obtained are not as good as those of Example I, they are nonetheless better than those obtained by prior methods, as illustrated in Example II.

Although our invention has been illustrated above only with respect to 2,4,5-T production, it is equally applicable to the formation of other aryloxyaliphatic acids. For example, it may be used to prepare 2,4-D by condensation with salts of 2,4-dichlorophenol with chloroacetic acid salts, to prepare phenoxyacetic acid itself by condensation of sodium phenolate or other phenolate salts with salts of haloacetic acids such as chloroacetic acid, bromoacetic acid, to prepare naphthoxyacetic acids by condensation of salts of naphthols with salts of haloacetic acids, to prepare phenoxypropionic acids by reaction of phenol salts with salts of halopropionic acids, and the like.

It is permissible to admix the reactants in accordance with our invention at any temperature up to and including the temperature at which the reaction is to be carried out. Normally, however, we prefer to introduce our haloaliphatic acid salt or free haloaliphatic acid into the reactor at a temperature of less than 90° C., as best results are obtained when doing this.

We have found that our invention is applicable to use with solid haloaliphatic acids, molten haloaliphatic acids, and haloaliphatic acids in aqueous solution, as well as with solutions of haloaliphatic acid salts.

The ratio of aromatic oxy compound salt to haloaliphatic acid may vary between wide limits so long as the amount of aromatic oxy compound amounts to at least 1 mole for every mole of haloaliphatic acid. An excess of about 1.4 moles of oxy compound per mole of haloaliphatic acid has been found particularly beneficial.

Likewise, our invention is applicable to reaction in very high concentration, such as concentrations of three molar or more with respect to each reactant, as well as low concentrations on the order of quarter molar or less in terms of each reactant. Generally, we prefer to operate in concentrations between 0.5 and 2 molar with respect to the various organic reactants.

The time of reaction can likewise vary between wide limits. For optimum yields the reaction should be carried out for about 1.5 to 3.5 hours. Shorter times can be used, but yields will be lower. Likewise, longer reaction times can be used, but there is no particular gain from the longer reaction periods.

Upon completion of the condensation reaction, any of various methods of recovery of the product is applicable. For example, the mixture can be cooled in the presence of inorganic salt such as sodium chloride to cause the salt of the aryloxyaliphatic acid to precipitate out, upon which this salt can be filtered and the filtered salt aidified to produce the desired product. Likewise, the crude reaction mixture can be acidified to convert the salt of the aryloxyaliphatic acid to the free acid which can be recovered by extraction with an organic solvent or by filtration, centrifugation, and the like.

We claim:

1. A continuous process for the manufacture of an aryloxyaliphatic acid substance by reacting a salt of a haloaliphatic acid with at least a stoichiometric equivalent of a preformed salt of an aromatic oxy compound in an aqueous alkaline medium under substantially reflux conditions, which process comprises introducing haloaliphatic carboxylic ion-yielding material and an excess of a preformed salt of an aromatic oxy compound into a reactor in such a manner that the entire amount of available haloaliphatic carboxylic ion-yielding material is introduced into the reactor in substantially hydroxide ion-free aqueous medium, heating the reaction mixture prior to the time that a stoichiometric equivalent of the aromatic oxy compound salt is present in said reaction mixture, refluxing said reaction mixture for from about 1.5 to about 3.5 hours subsequent to the addition of the entire amount of aromatic oxy compound salt, acidifying said reaction mixture, separating the organic phase therefrom, extracting said organic phase with an organic selective solvent in a first extraction step, recovering said aryloxyaliphatic acid as the residue from said first extraction step, extracting the solution of aromatic oxy compound formed in said first extraction step with an aqueous alkaline solution, recycling the organic solvent to said first extraction step, and recycling said aromatic oxy compound salt solution to the reaction step.

2. The process of claim 1 in which all the haloaliphatic carboxylic ion-yielding material is present before more than 5 percent of the aromatic oxy compound salt is present further characterized in that said reaction mixture is maintained at elevated temperature during the addition of the remaining aromatic oxy compound salt.

3. The process of claim 1 in which all the haloaliphatic carboxylic ion-yielding material is present before any of the aromatic oxy compound salt is present said salt being added while said reaction mixture is maintained at elevated temperature.

4. The process of claim 1 in which the haloaliphatic acid is chloroacetic acid and the aromatic oxy compound carboxylic ion-yielding material is sodium 2,4,5-trichlorophenolate.

5. A continuous process for the manufacture of 2,4,5-T, comprising introducing chloroacetic acid and excess aqueous sodium 2,4,5-trichlorophenolate to a reactor in such a manner that the entire amount of the chloroacetic acid is converted to chloroacetate ion in substantially hydroxide ion-free medium and heating said reaction mixture to reaction conditions prior to the time that a molecular equivalent of the sodium 2,4,5-trichlorophenolate is added, refluxing the reaction mixture for a period of 1.5–3.5 hours to effect reaction, acidifying the reaction mixture, separating the organic phase therefrom, extracting said organic phase with an organic selective solvent in a first extraction step, recovering 2,4,5-T as the residue from said first extraction step, extracting the solution of 2,4,5-trichlorophenol formed in said first extraction step with aqueous alkaline solution, recycling the organic solvent to said first extraction step, and recycling the sodium 2,4,5-trichlorophenolate solution to the reaction step.

References Cited in the file of this patent

UNITED STATES PATENTS

| | | |
|---|---|---|
| 2,516,611 | Berhenke et al. | July 25, 1950 |
| 2,599,250 | Fusco | June 3, 1952 |
| 2,656,382 | Kulka et al. | Oct. 23, 1953 |

FOREIGN PATENTS

| | | |
|---|---|---|
| 650,389 | Great Britain | Feb. 21, 1951 |